(12) United States Patent
Yasui et al.

(10) Patent No.: US 7,286,326 B2
(45) Date of Patent: Oct. 23, 2007

(54) MAGNETIC HEAD WITH AIR BEARING SURFACE PROTECTION FILM

(75) Inventors: Nobuto Yasui, Kanagawa (JP); Hiroshi Inaba, Yokohama (JP); Shinji Sasaki, Kanagawa (JP); Hiroshi Ishizaki, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 310 days.

(21) Appl. No.: 11/140,557

(22) Filed: May 27, 2005

(65) Prior Publication Data
US 2005/0264938 A1  Dec. 1, 2005

(30) Foreign Application Priority Data
May 27, 2004  (JP) ............................. 2004-157375

(51) Int. Cl.
*G11B 5/60* (2006.01)
(52) U.S. Cl. .................................. 360/235.2
(58) Field of Classification Search ............ 360/235.2, 360/235.1, 235.3, 235.8, 236.6, 236.7

See application file for complete search history.

(56) References Cited

U.S. PATENT DOCUMENTS

| | | | |
|---|---|---|---|
| 6,236,543 B1 * | 5/2001 | Han et al. | 360/236.6 |
| 6,793,778 B2 * | 9/2004 | Gador et al. | 204/192.11 |
| 2005/0045468 A1 * | 3/2005 | Hwang et al. | 204/192.15 |

FOREIGN PATENT DOCUMENTS

| | | |
|---|---|---|
| JP | 09-212840 A | 8/1997 |
| JP | 10-188506 A | 7/1998 |
| JP | 2001-123359 | 4/2000 |
| JP | 2001-297410 | 10/2001 |

* cited by examiner

*Primary Examiner*—Angel Castro
(74) *Attorney, Agent, or Firm*—Townsend and Townsend and Crew LLP; Duke Amaniampong

(57) ABSTRACT

Embodiments of the invention provide an air bearing surface protection film having good corrosive resistance, electrical insulative property and mechanical wear resistance in the state of an extremely thin film. In one embodiment, an air bearing surface protection film having good corrosive resistance, electrical insulative property and mechanical wear resistance in a state of an extremely thin film is obtained by disposing a thin silicon nitride film having high density, high electric resistance, chemical stability and high adhesion with a substrate as a lowermost air bearing surface protection film and disposing a film comprising tetrahedral amorphous carbon and nitrogen as an uppermost air bearing surface protection film.

10 Claims, 8 Drawing Sheets

(a)

(b)

MAGNETIC HEAD WITH AIR BEARING SURFACE PROTECTION FILM

CROSS-REFERENCES TO RELATED APPLICATIONS

This application claims priority from Japanese Patent Application No. JP2004-157375, filed May 27, 2004, the entire disclosure of which is incorporated herein by reference.

BACKGROUND OF THE INVENTION

The present invention relates to a magnetic head having a magnetoresistive device, e.g., of a giant magnetoresistive type or a tunneling magnetoresistive type.

In recent years, higher recording density has been progressed rapidly in magnetic disk writing/reading apparatus along with increase in the amount of information to be processed. For this purpose, it is an essential technical subject to reduce magnetic spacing, which is a distance between a magnetic head and a magnetic disk. However, as the flying height of the magnetic head decreases, it increases a possibility that a magnetic slider comes into contact with or collides against a magnetic disk surface rotating at high speed. Then, it is necessary that a protection film formed on an air bearing surface of the magnetic head slider is thin and tough, and has high wear resistance. On the other hand, since the magnetoresistive device constituting the magnetic head slider has a disadvantage in which the magnetic material tends to corrode or erode, it is necessary that the air bearing surface protection film also has a function of preventing corrosion of the magnetic material. Further, when a potential difference is formed between the magnetic head and the magnetic disk, electric discharge is generated between the magnetic head and the magnetic disk to destroy the magnetoresistive device. Therefore, the air bearing surface protection film has also been demanded to prevent such electric discharge. To cope with such requirements, a thin protection film has been demanded which does not leave dusts during sliding movement, has low friction coefficient, is excellent in wear resistance, has high density of atoms and thus is dense, and also is chemically stable. Carbon based thin films have often been used since they can satisfy the above requirements to some extent.

As described above, the air bearing surface protection film is formed on the air bearing surface of a magnetic head slider, and flaking of the air bearing surface protection film remarkably decreases mechanical wear resistance and chemical corrosive resistance. Accordingly, a silicon film or the like is located at the lowermost layer of the air bearing surface protection film at present so as to improve adhesion between the air bearing surface protection film and the air bearing surface.

For example, Japanese Patent Laid-open No. 10-188506 describes a magnetic head slider protection layer comprising a silicon adhesion layer and an upper layer coated on the silicon adhesion layer and containing at least silicon and oxygen or at least silicon and nitrogen disposed on an air bearing surface and an electromagnetic conversion device end face of the magnetic head slider.

Further, Japanese Patent Laid-open No. 9-21284 (Japanese Unexamined Patent Application No. 9-21284) describes a magnetic head slider protection film formed of a film containing at least two layers of a silicon film as an adhesion layer and a carbon layer as a protection film in which the silicon layer contains nitrogen.

BRIEF SUMMARY OF THE INVENTION

However, in the recent trend intending for further higher density recording, it has become necessary to reduce the distance between the magnetic head and the magnetic disk to an utmost limit. In addition, the air bearing surface protection film has been demanded to further reduce its thickness. The silicon film used as the existent adhesion layer of the air bearing surface protection film abruptly decreases its flawlessness at a film thickness of about 2.0 nm or less as will be described later in the example. Thus, it is possible that the silicon film is present in an island-like structure not as a continuous film. The island-like structure at first lowers the corrosive resistance and electrical insulative property since it lacks denseness. Further, since the area where the air bearing surface is covered by the film is decreased, this results in lowering of the adhesion property and, thus, lowering of mechanical wear resistance. Accordingly, as the thickness of the silicon film go down to 2.0 nm or less, the known protection film for air bearing surface comprising a silicon film and a carbon based thin film is insufficient in terms of the mechanical wear resistance, the corrosive resistance and electrical insulative property.

A method of forming a protection film with no adhesion layer has been attempted by using, for example, a single silicon nitride film layer for reducing the thickness of the air bearing surface protection film. The silicon nitride film is excellent in the denseness and also excellent in adhesion with the air bearing surface compared with amorphous carbon. However, in such a constitution, since dusts caused from silicon in the protection film are formed due to collision between the head and the disk, mechanical wear resistance is not favorable.

A silicon nitride has been examined as an adhesion layer for an amorphous carbon film formed by a sputtering deposition method or a CVD method intending to decrease the film thickness and improve the reliability of the air bearing surface protection film. This prior invention has been achieved with an aim of improving the mechanical wear resistance of a magnetic head by improvement of the air bearing surface protection film. However, in view of the corrosive resistance of the magnetic head, the invention involves the problems as described below.

At first, for the amorphous carbon film formed by a CVD method, hydrogen or a hydrogen containing gas is used in the process but this takes place reaction with nitrogen in a silicon nitride adhesion layer to possibly evaporate nitrogen. Since the reaction partially deprives nitrogen from the silicon nitride film, the silicon nitride film becomes porous as a result.

Further, the amorphous carbon film formed by a sputtering deposition method and a hydrogen-containing amorphous carbon film formed by a CVD method have a drawback in which the denseness is not sufficient. A method is achieved in order to increase the denseness of the amorphous carbon film formed by the sputtering deposition method. This method uses a gas containing a hydrocarbon series compound or hydrogen and forms the film by a reactive sputtering deposition method. However, the use of this method is not preferred because it results in a phenomenon in which hydrogen described above degrades the silicon nitride film.

As described above, the air bearing surface protection film comprising an amorphous carbon film and silicon nitride formed by a sputtering deposition method or a CVD method is unsatisfactory in view of the corrosive resistance.

Accordingly, a feature of this invention is to provide a magnetic head having an air bearing surface protection film, which is extremely excellent in mechanical wear resistance, corrosive resistance and electric insulative property.

In accordance with an aspect of the present invention, a magnetic head comprises an air bearing surface protection film of a multi-layered structure including an uppermost layer for the air bearing surface protection film comprising tetrahedral amorphous carbon and nitrogen, and a lowermost layer for the air bearing surface comprising nitrogen and silicon (adhesion layer). The content will be described specifically.

First, the feature of the layer comprising nitrogen and silicon constituting the lowermost layer of the air bearing surface protection film is to be described. While silicon employed in the existent adhesion layer has a density of 2.0 g/cc as a bulk material and density of atoms (4.3×10+22 atoms/cc), the density of silicon nitride as a bulk material is 3.2 g/cc (density of atoms 9.5×10+22 atoms/cc). Since the corrosive resistance of the air bearing surface protection film is greatly influenced by the number of pinholes upon forming the air bearing surface protection film, a dense silicon nitride film, which has less pinholes than the existent Si film does, can provide an air bearing surface protection film of excellent corrosive resistance. Further, since silicon nitride is an insulator and has high electric resistance, it can provide an air bearing surface protection film of excellent electrical insulative property compared with silicon in the prior art. Further, since the bonding energy between nitrogen and carbon (754.3 kJ/mol) is higher than that between silicon and carbon (451.5 kJ/mol), a higher adhesion strength can be expected between the tetrahedral amorphous carbon film contained in the uppermost layer of the air bearing surface and a silicon nitride adhesion layer as a lowermost layer of the air bearing surface. As a result, it can provide an air bearing surface protection film excellent in mechanical wear resistance.

In the thin silicon nitride film forming the lowermost layer of the air bearing surface protection film according to embodiments of the invention, an air bearing surface protection film having favorable characteristics in corrosive resistance, electrical insulative property and mechanical wear resistance can be obtained by defining the content of nitrogen to about 45 atomic % or more and the density thereof to about 2.6 g/cc or more. Further, when the thickness of the silicon nitride as the adhesion layer is about 0.5 nm or more, an air bearing surface protection film having improved characteristics compared with the existent air bearing surface protection film can be obtained.

The film comprising tetrahedral amorphous carbon and nitrogen forming the uppermost layer of the air bearing surface protection film according to embodiments of the invention has features in which hydrogen that deteriorates the quality of the thin silicon nitride film is not contained in the process and in the film to be formed, and in which it has a density of about 2.5 g/cc or more. Further, nitrogen forming the uppermost layer of the air bearing surface protection film together with tetrahedral amorphous carbon according to embodiments of the invention contributes to the increase of the adhesion with the lowermost layer of the air bearing surface protection film and reduction in the friction coefficient of the uppermost layer of the air bearing surface protection film. As described above, the uppermost layer of the air bearing surface protection film comprising tetrahedral amorphous carbon and nitrogen can attain excellent corrosive resistance, electrical insulative property and mechanical wear resistance provided by the lowermost layer of the air bearing surface protection film comprising silicon nitride.

The characteristics of amorphous carbon are mainly determined by sp3 content and hydrogen content. Bonding between carbon atoms in amorphous carbon is mainly constituted with two types of bondings. The two types of bonding are sp2 bonding and sp3 bonding. The former is the bonding form of graphite and the later is the bonding form of diamond. The tetrahedral amorphous carbon is amorphous carbon of high sp3 content. In a case of measuring the sp3 content of amorphous carbon in a protection film on a small object such as a magnetic head, a Raman spectrometry is often used. While almost all of spectra obtained by a conventional Ar light source at a wavelength of 514.5 nm are from sp2 component, the content of sp3 can be estimated indirectly from the Raman spectra due to sp2 bondings. Specifically, as the intensity of peak B of about 1200 to 1450 cm−1 is smaller relative to the intensity of peak A of about 1500 to 1600 $cm^{-1}$, it shows that more sp3 bondings are present around sp2 bondings. The Raman spectrum for tetrahedral amorphous carbon forming the air bearing surface protection film in the present embodiment is characterized in that the intensity ratio (B/A) between the peak A and peak B obtained as a result of fitting by a Gaussian function is about 0.0 or more and about 0.4 or less.

A general method for quantitative analysis for the hydrogen content of amorphous carbon is TOF-SIMS (Time Of Flight—Secondary Ion Mass Spectroscopy). The TOF-SIMS is a method of irradiating the surface of a solid specimen with an ion beam, and observing the flying velocity of sputtered particles thereby identifying and quantitizing elements present on the surface. In a case of observing the hydrogen content in the air bearing surface protection film of 5 nm or less on a magnetic head air bearing surface by a trace element detection method such as TOF-SIMS, the tetrahedral amorphous carbon forming the air bearing surface protection film according to embodiments of the invention has a feature that the hydrogen content in the film is about 25 atomic % or less. It should be noted that the content of hydrogen is 3 atomic % or less when measured tetrahedral amorphous carbon deposited in the same method is about 50 nm-thick, but when an extremely thin film at a thickness of 5 nm or less on the magnetic head is measured by TOF-SIMS as described above, it is detected as if hydrogen was contained to some extent in the film due to surface adsorption products or diffusion thereof. However, since the tetrahedral amorphous carbon observed as that the hydrogen content is about 25 atomic % or less on the magnetic head air bearing surface by TOF-SIMS shows no effect of hydrogen induced degradation for the silicon nitride film, it is suitable for combination with silicon nitride.

As described above, according to the magnetic head of the present embodiment, the use of the dense lowermost layer for the air bearing surface protection film comprising nitrogen and silicon, and an uppermost layer for the air bearing surface protection film comprising tetrahedron amorphous carbon and nitrogen can drastically improve the corrosive resistance, the electrical insulative property and the adhesion strength with the magnetic head slider material. In addition, as a result, the thickness of the air bearing surface protection film can be reduced, the distance between the head and the disk can be decreased to improve the recording density and, at the same time, reliability in magnetic writing and reading can be improved.

DETAILED DESCRIPTION OF THE INVENTION

Figure 1:
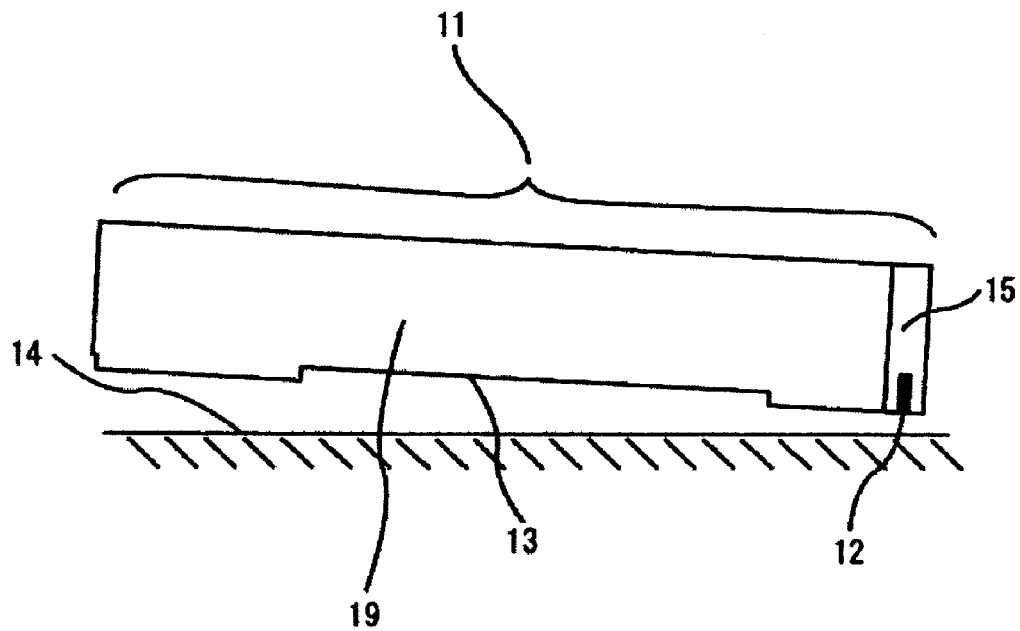
FIG. 1 is a schematic view showing a magnetic head according to an embodiment of the present invention.

FIG. 1 is a schematic view of a magnetic head 11. The magnetic head 11 is located so as to face a magnetic disk 14 as a magnetic recording medium. A magnetic head air bearing surface 13 is a surface of the magnetic head 11 on the side of the magnetic disk 14. A magnetic head substrate 19 is formed of a material comprising alumina-titanium-carbide. A magnetic head outflow side 15 mainly comprises an alumina film and has a magnetic head element 12 incorporated therein for reading and writing data.

Figure 2:
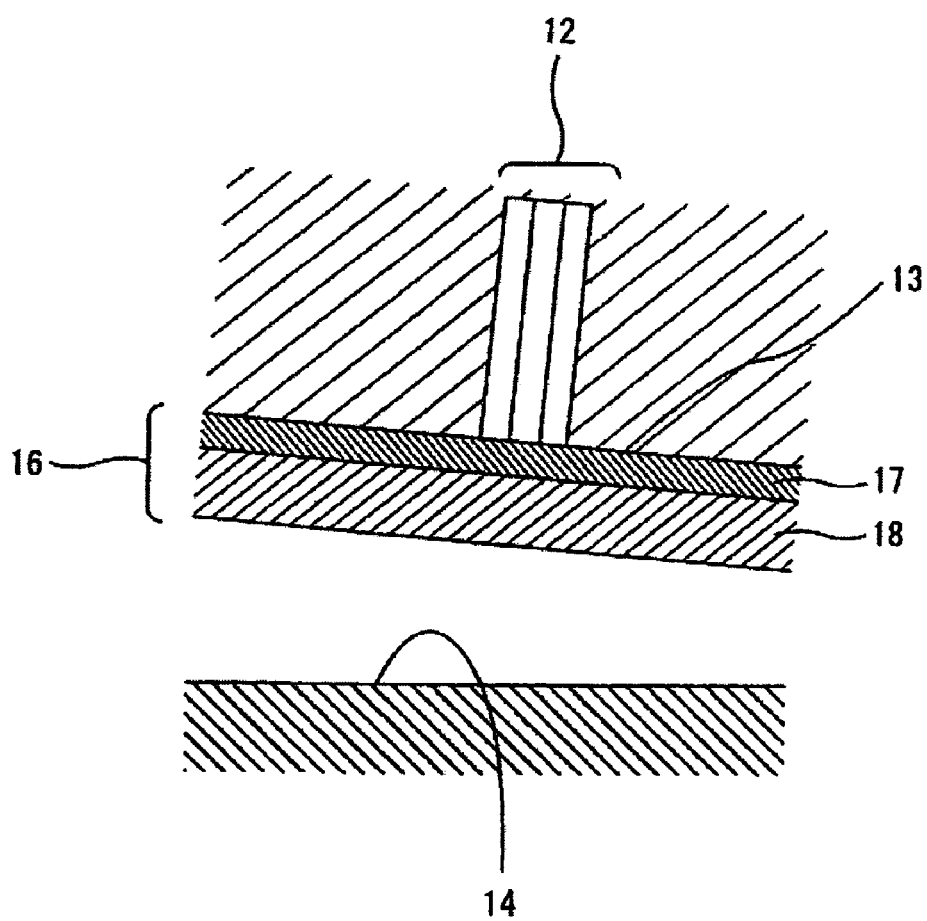
FIG. 2 is an enlarged view of a magnetic head outflow side 15 shown in FIG. 1.

FIG. 2 is a schematic view between the magnetic head 11 and the magnetic disk 14 near the magnetic head outflow side 15. An air bearing surface protection film 16 is formed on the magnetic head air bearing surface 13. In FIG. 2, the air bearing surface protection film 16 comprises two layers of a lowermost air bearing surface protection film layer 17 and an uppermost air bearing surface protection film layer 18. The uppermost air bearing surface protection film layer 18 is disposed in the air bearing surface protection film 16 at a position nearest to the magnetic disk 14. In the present embodiment, the uppermost air bearing surface protection film 18 is formed of a film comprising tetrahedral amorphous carbon and nitrogen. The lowermost air bearing surface protection film 17 is located at a portion in contact with the magnetic head air bearing surface 13. In the present embodiment, the lowermost air bearing surface protection film 17 is formed of a silicon nitride film.

Figure 3:
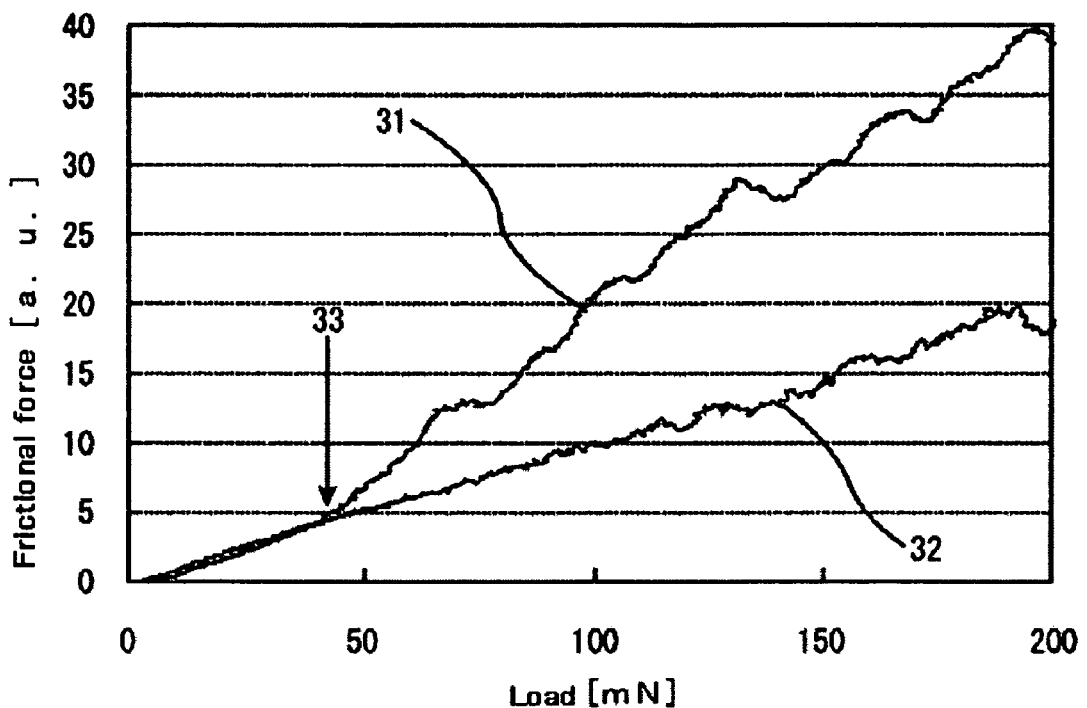
FIG. 3 is a graph showing the result of a scratch test pertaining to an embodiment of the invention, in which the ordinate expresses the frictional force and the abscissa expresses the applied load.

FIG. 3 shows a result of micro-scratch test on the magnetic head air bearing surface 13 of the magnetic head 11. An experimental example (Comparative Example 1) in a case where the lowermost air bearing surface protection film 17 is a thin silicon film and the uppermost air bearing surface protection film 18 is a tetrahedral amorphous carbon film is denoted by numeral 31. An experimental example in a case where the lowermost air bearing surface protection film 17 is a thin silicon nitride film and the uppermost air bearing surface protection film 18 is a film comprising tetrahedral amorphous carbon and nitrogen is denoted by numeral 32. The micro-scratch test is a method of measuring the friction response of the surface. Specifically, this is a method of pressing a stylus, a hemi-spherical diamond tip attached on a cantilever, to the specimen surface while vibrating in parallel with the specimen surface and pulling the specimen surface in one direction while increasing the load thereby observing a tensile friction response. Since friction response increases rapidly due to micro particles formed when the thin film is flaked, a load at which the thin film is flaked can be recognized through observation. In Experimental Example 31 (Comparative Example 1), since abrupt increase of the friction response is observed when it exceeds a load shown by numeral 33, it can be seen that flaking is caused at the load. The load at 33 is referred to as a flaking point.

Figure 4:
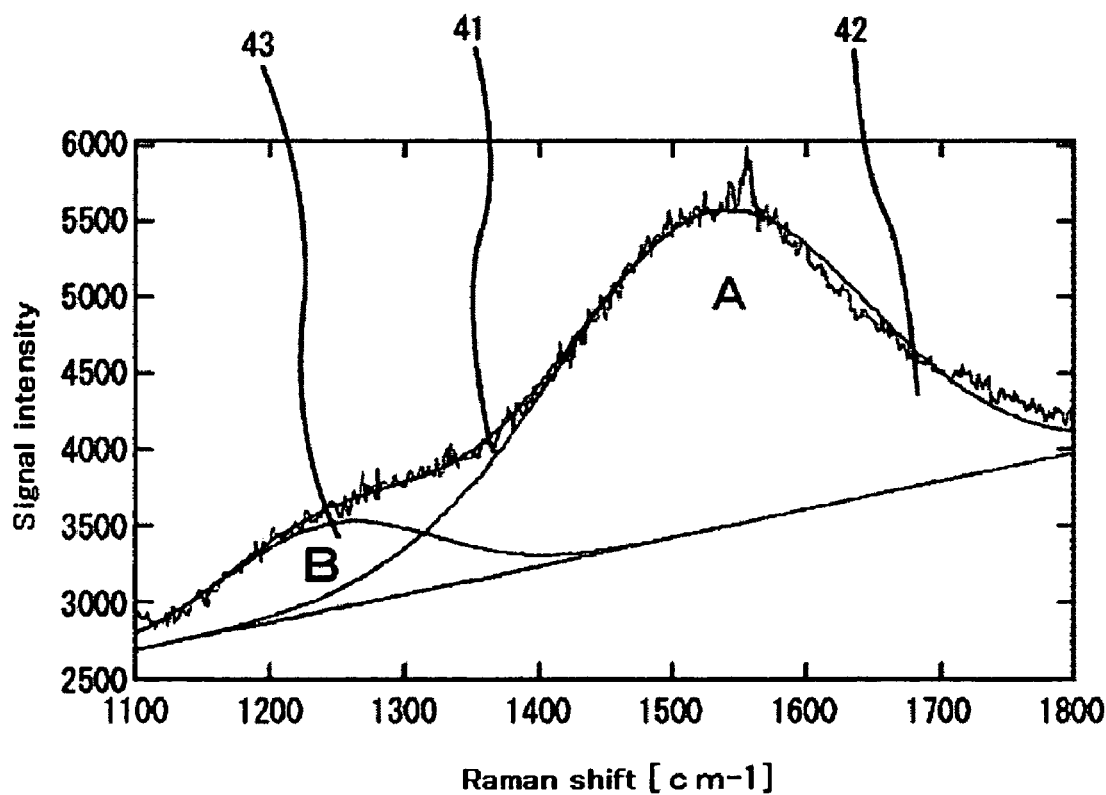
FIG. 4 is a Raman spectral chart for a tetrahedral amorphous carbon film formed by a cathodic vacuum arc discharge deposition method according to an embodiment of the invention at a device portion on a magnetic head air bearing surface.

FIG. 4 shows a Raman spectrum of a tetrahedral amorphous carbon film formed by a cathodic vacuum arc discharge deposition method. Numeral 41 denotes a Raman spectrum obtained by measuring an air bearing surface protection film 16 on a magnetic head element 12 of a magnetic head air bearing surface 13. Numeral 42 shows a waveform A having a peak near about 1500 to 1600 $cm^{-1}$ when fitting the Raman spectrum 41 by using a Gaussian function and numeral 43 is a waveform B having a peak near about 1200 to 1450 $cm^{-1}$. The cathodic vacuum arc discharge deposition method is a method of forming a thin film, etching or the like as follows: allowing an arc current of about several tens ampere to flow a target portion as a cathode by electrical contact of an electrode usually referred to as a striker or by using an electron beam to generate arc discharge and keeping plasmas to exist by generating it in the upper space of the target; introducing plasmas containing ions and electrons efficiently into a vacuum reaction chamber using a magnetic field duct for transportation and a magnetic field duct for scanning; and applying them uniformly to a substrate to be processed.

Figure 5:
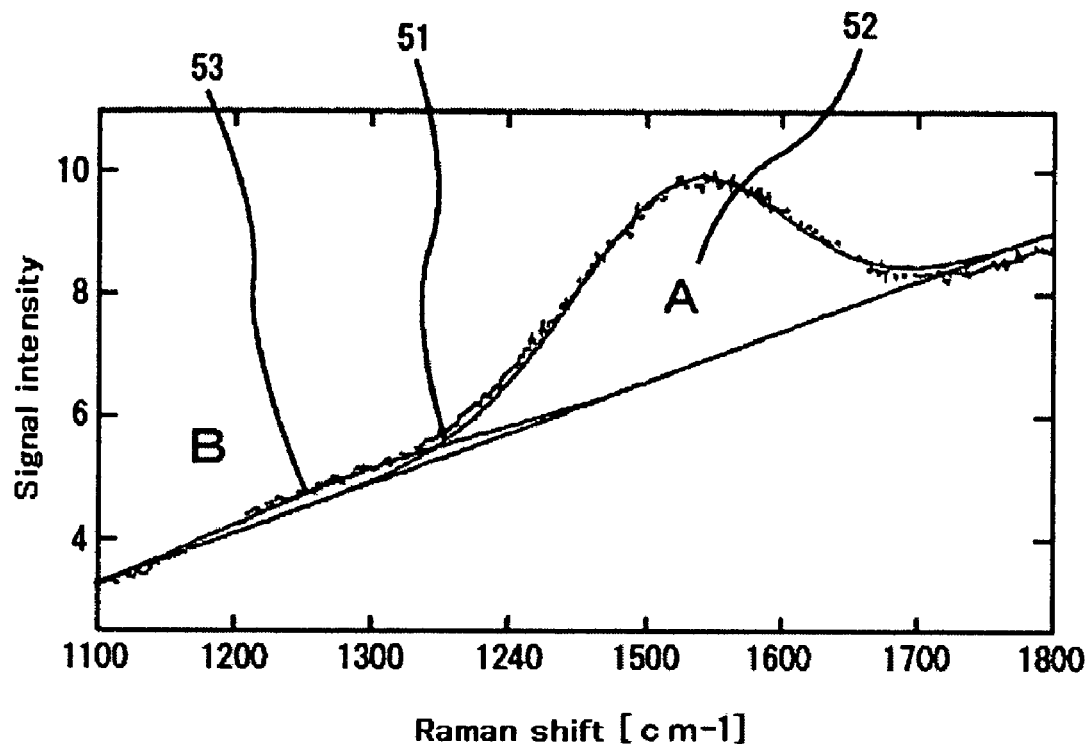
FIG. 5 is a Raman spectral chart for a tetrahedral amorphous carbon film formed by a cathodic vacuum arc discharge deposition method according to an embodiment of the invention at an alumina-titanium-carbide substrate portion on a magnetic head air bearing surface.

FIG. 5 shows the Raman spectrum of a tetrahedral amorphous carbon film formed by cathodic vacuum arc discharge deposition method measured on an alumina-titanium-carbide substrate on the magnetic head air bearing surface 13. Numeral 51 denotes Raman spectrum for tetrahedral amorphous carbon on the alumina-titanium-carbide substrate.

Figure 6:
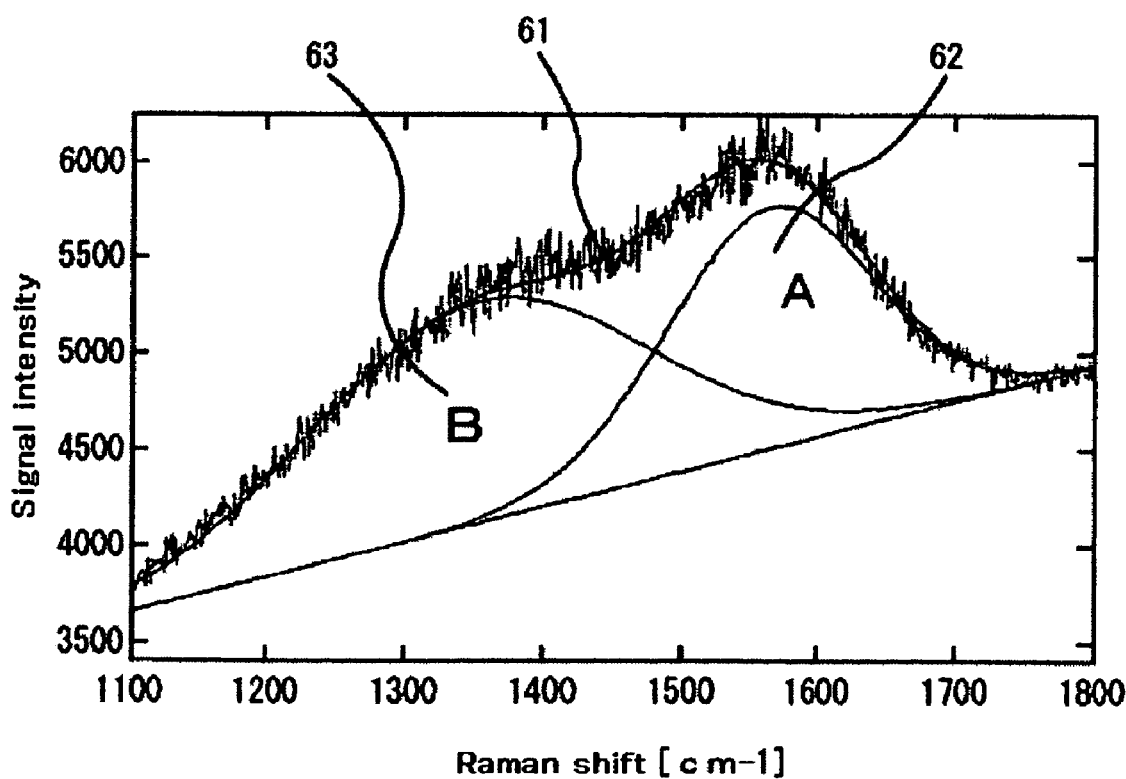
FIG. 6 is a Raman spectral chart for an amorphous carbon film formed by a sputtering deposition method according to an embodiment of the invention at a device portion on a magnetic head air bearing surface.

FIG. 6 shows the Raman spectrum of an amorphous carbon film formed by a sputtering deposition method. Numeral 61 denotes Raman spectrum obtained by measuring an air bearing surface protection film 16 on a magnetic head element 12 of the magnetic head air bearing surface 13. Numeral 62 denotes a waveform A having a peak near about 1500 to 1600 $cm^{-1}$, obtained by fitting Raman spectrum 61 using a Gaussian function, and numeral 63 denotes a waveform B having a peak near about 1200 to 1460 $cm^{-1}$.

Figure 7:
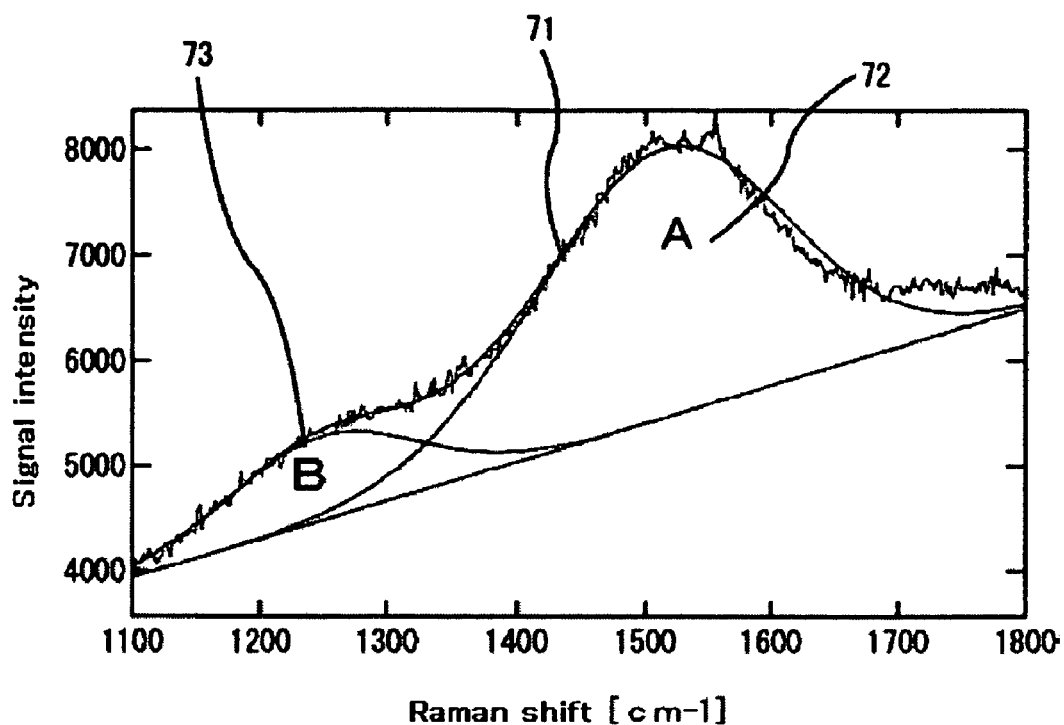
FIG. 7 is a Raman spectral chart for a hydrogen-containing amorphous carbon film formed by a CVD method according to an embodiment of the invention at a device portion on a magnetic head air bearing surface.

FIG. 7 shows the Raman spectrum of an amorphous carbon film formed by a CVD method. Numeral 71 denotes a Raman spectrum obtained by measuring the air bearing surface protection film 16 on the magnetic head element 12 of the magnetic head air bearing surface 13. Numeral 72 denotes a waveform A having a peak near about 1500 to 1600 $cm^{-1}$, obtained by fitting the Raman spectrum 71 using a Gaussian function and numeral 73 denotes a waveform B having a peak near about 1200 to 1450 $cm^{-1}$.

Figure 8:
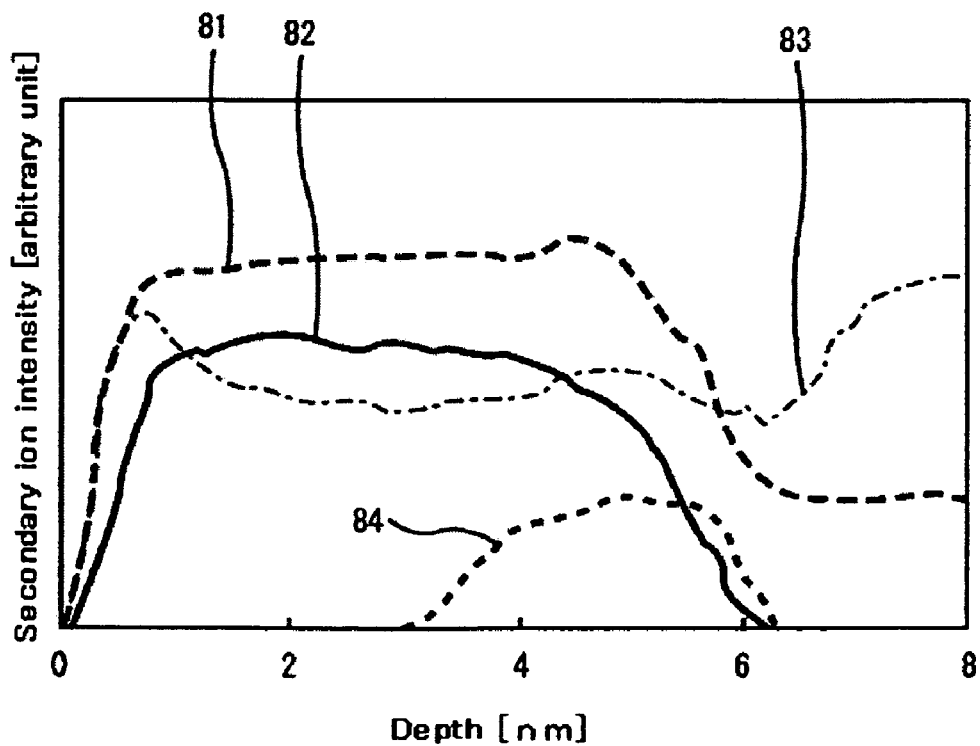
FIG. 8 is a graph showing the measurements by TOF-SIMS for an air bearing surface protection film consisting of an uppermost layer comprising a hydrogen-containing amorphous carbon and a lowermost layer comprising silicon formed by a CVD deposition method at a magnetic head air bearing surface according to an embodiment of the invention.

FIG. 8 shows a TOF-SIMS result of the magnetic head air bearing surface 13 having an air bearing surface protection film 16 formed of an uppermost air bearing surface protection film 18 comprising an amorphous carbon film formed by a CVD method, and a lowermost air bearing surface protection film 17 comprising a silicon. Numeral 81 denotes an experimental example showing the secondary ion intensity of hydrogen. Numeral 82 denotes an experimental example showing the secondary ion intensity of carbon. Numeral 83 is an experimental example showing the secondary ion intensity of oxygen. Numeral 84 is an experimental example showing the secondary ion intensity of silicon.

Figure 9:
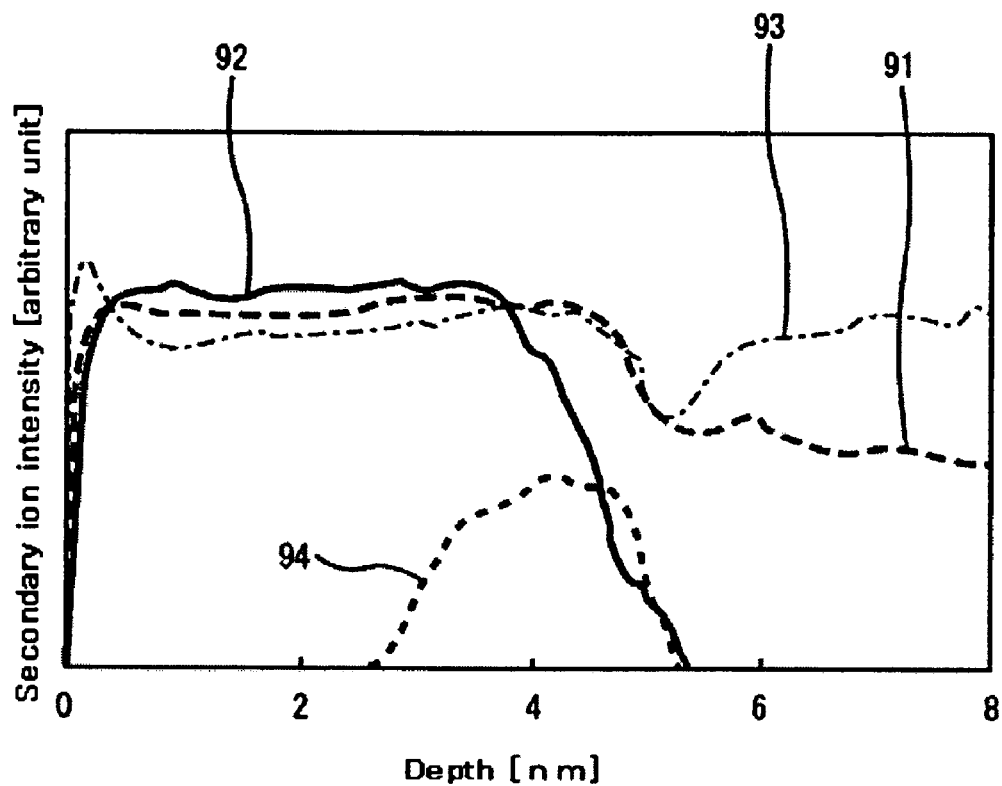
FIG. 9 is a graph showing the measurements by TOF-SIMS for an air bearing surface protection film consisting of an uppermost layer comprising tetrahedral amorphous carbon and a lowermost layer comprising silicon at a magnetic air bearing surface according to an embodiment of the invention.

FIG. 9 shows a TOF-SIMS result of the magnetic head air bearing surface 13 having an air bearing surface protection film 16 formed of an uppermost air bearing surface protection film 18 comprising a tetrahedral amorphous carbon film and a lowermost air bearing surface protection film 17 comprising a silicon film. Numeral 91 denotes an experimental example showing the secondary ion intensity of hydrogen. Numeral 92 denotes an experimental example showing the secondary ion intensity of carbon. Numeral 93 denotes an experimental example showing the secondary ion intensity of oxygen. Numeral 94 denotes an experimental example showing the secondary ion intensity of silicon.

Figure 10:
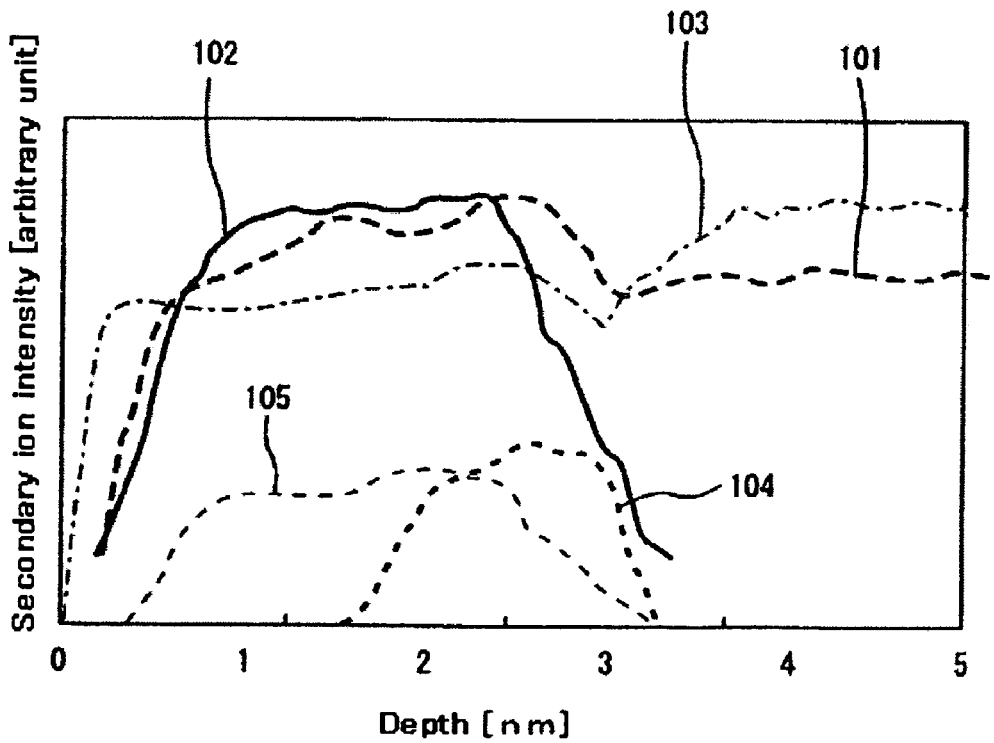
FIG. 10 is a graph showing the measurements by TOF-SIMS for an air bearing surface protection film consisting of an uppermost layer comprising tetrahedral amorphous carbon and nitrogen and a lowermost layer comprising silicon nitride at a magnetic head air bearing surface according to an embodiment of the invention.

FIG. 10 shows a TOF-SIMS result of the magnetic head air bearing surface 13 having an air bearing surface protection film 16 formed of an uppermost air bearing surface protection film 18 comprising tetrahedral amorphous carbon and nitrogen and a lowermost air bearing surface protection film 17 comprising a silicon nitride film. Numeral 101 denotes an experimental example showing the secondary ion intensity of hydrogen. Numeral 102 denotes an experimental example showing the secondary ion intensity of carbon. Numeral 103 denotes an experimental example showing the secondary ion intensity of oxygen. Numeral 104 denotes an experimental example showing the secondary ion intensity of silicon. Numeral 105 denotes an experimental example showing the secondary ion intensity of nitrogen.

Figure 11:
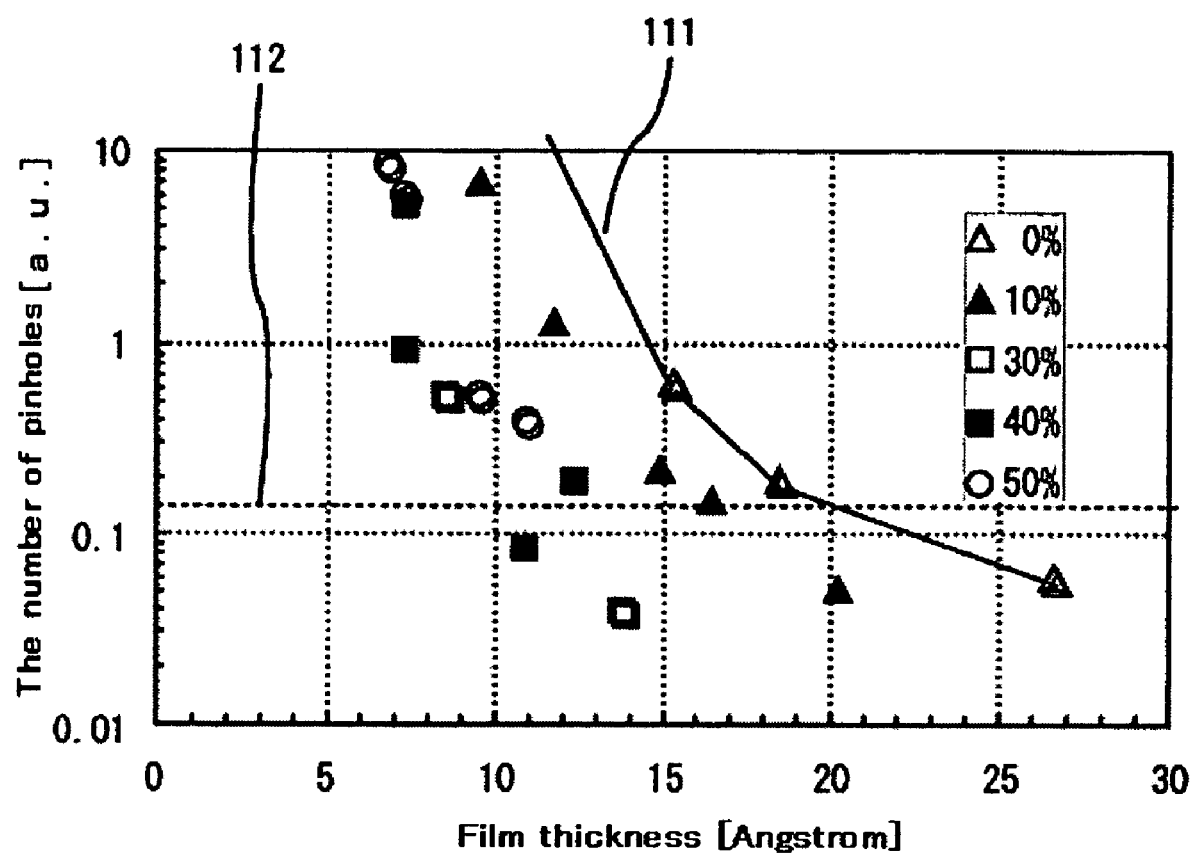
FIG. 11 is a graph showing the result of a pinhole test for a silicon nitride film according to an embodiment of the invention.

FIG. 11 is a graph showing a relation between the number of pinholes [a.u.] and a film thickness [angstrom] in a thin silicon nitride film according to an embodiment of the invention. The thin silicon nitride film is formed while the nitrogen content in a sputtering gas is changed from 0% to 50%. In the graph, nitrogen content 0%, 10%, 30%, 40%, and 50% are represented, respectively, by blank trigonal, solid trigonal, blank square, solid square and blank circle. At nitrogen content of 0%, a thin silicon film as in the prior art is formed. Experimental Example 111 relating to the number of pinholes for the thickness of thin silicon film is shown by solid line in the graph. In the prior art, the lowermost air bearing surface protection film 17 is formed of a thin silicon film of 2 nm thick. A dotted line 112 shows the number of pinholes in a thin silicon film of 2 μm thick.

FIG. 12(a) is a graph showing the dependence of an optical constant n on the nitrogen flow ratio [%] in the process when the silicon nitride film of the present embodiment was formed using a reactive sputtering deposition method. FIG. 12(b) is a graph showing the dependence of the nitrogen content [%], which is determined from the optical constant n, on the nitrogen flow ratio [%] in the process.

Figure 13:
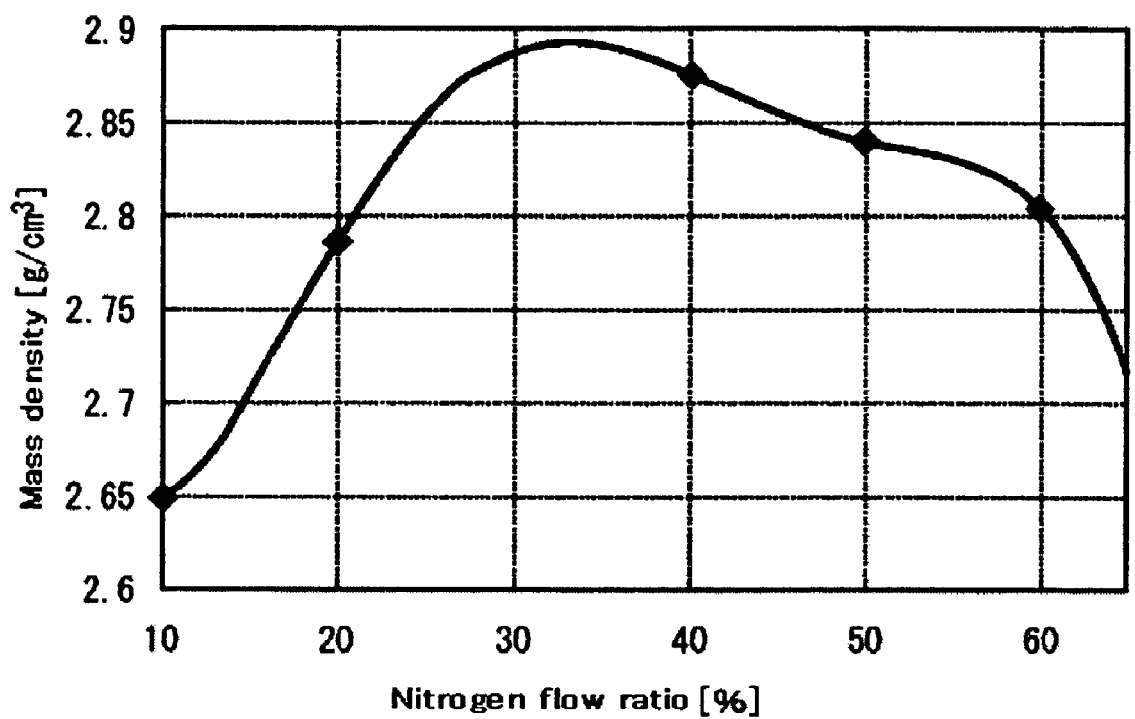
FIG. 13 is a graph showing the change of a mass density on the change of a nitrogen flow ratio according to an embodiment of the invention.

FIG. 13 is a graph showing a relation between the mass density [g/cm3] of a formed thin silicon nitride film and the nitrogen flow ratio [%] in a sputtering gas used in reactive sputtering of the thin silicon nitride film according to an embodiment of the invention.

Figure 14:
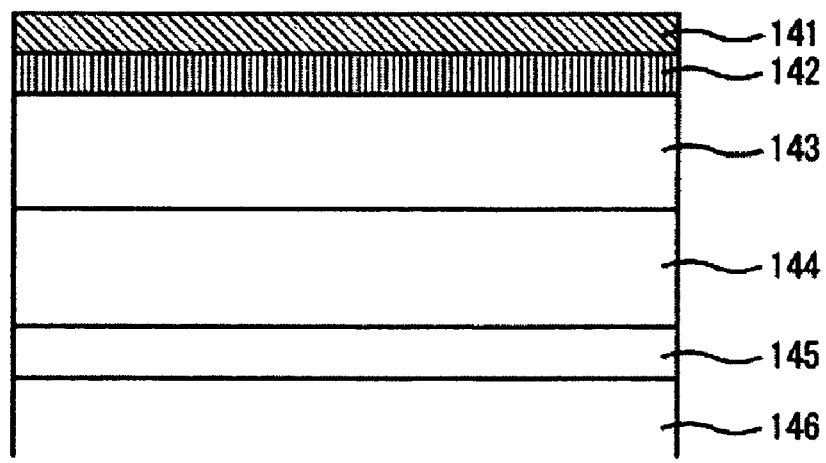
FIG. 14 is a cross sectional constitutional view for a magnetic disk having a protection film according to an embodiment of the invention.

FIG. 14 is a cross-sectional constitutional view of a magnetic disk having a protection film of the present embodiment.

COMPARATIVE EXAMPLE 1

Comparative Example 1 concerning the preparation of a magnetic head air bearing surface protection film is to be described. At first, the magnetic head 11 is transported into a vacuum chamber, which is then evacuated. Thereafter, the air bearing surface is etched by using plasma or ion beams with Ar or other rare gases.

Next, a silicon film is formed by a sputtering deposition method as the lowermost air bearing surface protection film 17 and then a tetrahedral amorphous carbon film is formed by a cathodic vacuum arc discharge deposition method as the uppermost air bearing surface protection film 18. The cathodic vacuum arc discharge deposition method is a method of forming a carbon film by deposition of carbon ions extracted from an arc plasma source.

Characteristics of the magnetic head having the air bearing surface protection film of Comparative Example 1 are to be described. Comparative Example 1 is a magnetic head having the air bearing surface protection film 16 with the total film thickness of 3.0 nm. Table 1 shown below represents corrosive resistance of magnetic heads having a air bearing surface protection films. Table 1 shows results obtained by performing corrosion three tests, i.e., high temperature high humidity test, gas corrosion test and acid dipping test. The high temperature high humidity test is a test of placing a magnetic head in a chamber at a temperature of 80° C. and at a humidity of 85% for 100 hours and examining the corrosive resistance based on the ratio of devices whose electrical resistance was changed after the test. In a case where the number of devices with changed electrical resistance is within 5%, the devices are judged to be sufficiently corrosive resistive. The gas corrosion test is a test of placing the magnetic head in a chamber with a corrosive gas and examining the corrosive resistance by observing the change of appearance of the magnetic head element. In a case where the corrosion ratio is 5% or less for 20 hour's exposure to the corrosive gas, the devices are judged to be sufficiently corrosive resistive. The acid dipping test is a test of dipping a magnetic head in a corrosive liquid and examining a corrosive resistance by observing the electrical resistance change in the magnetic head element. In a case where the corrosion ratio is 5% or less, the devices are judged to be sufficiently corrosive resistive. Magnetic heads that are judged to be sufficiently corrosive resistive in all of the corrosion tests are judged to have sufficient reliability.

In Comparative Example 2, the lowermost air bearing surface protection film 17 is formed of a silicon nitride film. The silicon nitride film is formed by a reactive sputtering deposition method. In the reactive sputtering deposition method, a magnetic head slider is transported into a film deposition chamber for the lowermost air bearing surface protection film 17 and then argon and nitrogen are introduced as a sputtering gas into the film deposition chamber. In this process, the property of the silicon nitride film to be

TABLE 1

| | Air bearing surface protection film | High temperature high humidity test | Gas corrosion test | Acid dipping test | Judgement |
|---|---|---|---|---|---|
| Experimental Example 1 | Total film thickness 3.0 nm Uppermost layer: tetrahedral amorphous carbon + nitrogen 2.0 nm Lowermost layer: nitrogen + silicon 1.0 nm | 0% | 2% | 2% | ○ |
| Experimental Example 2 | Total film thickness 2.6 nm Uppermost layer: tetrahedral amorphous carbon + nitrogen 1.8 nm Lowermost layer: nitrogen + silicon 0.8 nm | 0% | 0% | 2% | ○ |
| Experimental Example 3 | Total film thickness 2.1 nm Uppermost layer: tetrahedral amorphous carbon + nitrogen 1.3 nm Lowermost layer: nitrogen + silicon 0.8 nm | 100% | 0% | 95% | x |
| Comparative Experimental Example 1 | Total film thickness 3.0 nm Uppermost layer: tetrahedral amorphous carbon 2.0 nm Lowermost layer: silicon 1.0 nm | 40% | 5% | 50% | x |
| Comparative Experimental Example 2 | Total film thickness 4.0 nm Uppermost layer: sputtered amorphous carbon 2.0 nm Lowermost layer: nitrogen + silicon 1.0 nm | 80% | — | 70% | x |
| Comparative Experimental Example 3 | Total film thickness 3.0 nm Uppermost layer: amorphous carbon + hydrogen 2.0 nm Lowermost layer: silicon 1.0 nm | 65% | — | 60% | x |
| Comparative Experimental Example 4 | Total film thickness 3.0 nm Uppermost layer: amorphous carbon + hydrogen 2.0 nm Lowermost layer: nitrogen + silicon 1.0 nm | 70% | — | 60% | x |

The corrosion test shows that magnetic heads having the air bearing surface protection film 16 with a total thickness of 3 nm comprising a combination of 1 nm silicon film and 2 nm tetrahedral amorphous according to Comparative Example 1 did not pass the corrosion test.

The result of the micro-scratch test on the magnetic head air bearing surface 13 of the air bearing surface protection film 16 in this Comparative Example 1 is shown as Experimental Example 31 (Comparative Example 1) in FIG. 3. According to FIG. 3, a distinct flaking point shown at numeral 33 was observed for Experimental Example 31. It is possible that the air bearing surface protection film 16 was flaked under the load at the flaking point.

COMPARATIVE EXAMPLE 2

Comparative Example 2 concerning the preparation of the protection film for the magnetic head air bearing surface is to be described.

formed can be changed by changing the ratio of the flow rate of entering nitrogen relative to the total flow rate of the sputtering gas (hereinafter referred to as nitrogen flow ratio). In Comparative Example 2, film deposition was conducted at a nitrogen flow rate ratio of 40%. After introduction of the sputtering gas, plasma is generated by application of RF (radio frequency). Silicon is used as a target in sputtering. Ionized argon and nitrogen cause nitridation and sputtering at the surface of the target and, as a result, a silicon nitride film is formed on the magnetic head air bearing surface.

After the formation of the lowermost air bearing surface protection film 17 comprising a silicon nitride film, an amorphous carbon film is deposited by a sputtering deposition method as the uppermost air bearing surface protection film 18. In the sputtering deposition method, a rare gas such as Ar is used as a sputtering gas.

The corrosive resistance of the magnetic head having the air bearing surface protection film 16 formed by Comparative Example 2 is shown in a column of Table 1 for Comparative Example 2. The air bearing surface protection film of the total film thickness of 4 nm comprising a 2 nm silicon nitride film and a 2 nm amorphous carbon film formed by sputtering deposition did not pass the corrosion test.

COMPARATIVE EXAMPLES 3 AND 4

In Comparative Examples 3 and 4, the uppermost air bearing surface protection film 18 is formed of a hydrogen-containing amorphous carbon film by a CVD method. The lowermost air bearing surface protection film 17 is formed of a silicon film formed by a sputtering deposition method in Comparative Example 3, and it is formed of a silicon nitride film formed by a reactive sputtering deposition method in Comparative Example 4.

The corrosive resistance of the magnetic heads each having the air bearing surface protection film 16 formed in each of Comparative Examples 3 and 4 is shown in a column of Table 1 for each of Comparative Examples 3 and 4. In Comparative example 3, the lowermost air bearing surface protection film 17 is formed of a silicon film and, in Comparative Example 4, the lowermost air bearing surface protection film 17 is formed of a silicon nitride film. Both of magnetic heads in Comparative Examples 3 and 4 did not pass the corrosion test.

EXAMPLE 1

A process flow concerning the preparation of a protection film for a magnetic head air bearing surface according to an embodiment of the present invention is to be described. At first, the magnetic head 11 is transported into a vacuum chamber, which is then evacuated. In this case, the magnetic head may be in a slider shape or in a bar shape. Subsequently, the air bearing surface is etched by using plasma or ion beams with Ar or other rare gas. The etching is used for removing machined surface layer, oxide layer, etc. during fabrication of the magnetic head air bearing surface. While it is not always a necessary step in the invention, it is preferably practiced.

Successively, the lowermost air bearing surface protection film 17 is formed. In the present embodiment, the lowermost air bearing surface protection film 17 is formed of a silicon nitride film. In Example 1, the silicon nitride film is formed by reactive sputtering. In Example 1, a sputtering gas is introduced at nitrogen flow ratio of 40% into the film deposition chamber, then plasma is formed by application of RF, and the silicon target is sputtered by the generated plasma for film deposition. A silicon nitride film having comparable property can also be formed by using a silicon nitride target. For the method of forming the silicon nitride film used for the lowermost air bearing surface protection film 17, a silicon nitride comparable with that formed by the reactive sputtering can be formed also using a film deposition method by using ion beams such as ion beam assisted sputtering.

Successive to the formation of the lowermost air bearing surface protection film 17 comprising the silicon nitride film, an uppermost air bearing surface protection film 18 is formed. A layer containing tetrahedral amorphous carbon and nitrogen is formed as the uppermost air bearing surface protection film 18. In Example 1, a cathodic vacuum arc discharge deposition method is used as a method of forming a layer containing tetrahedral amorphous carbon and nitrogen. Nitrogen is incorporated into the uppermost air bearing surface protection film 18 by thermal diffusion motion of partial nitrogen from the lowermost air bearing surface protection film 17 by carbon ion bombardment during the cathodic vacuum arc discharge deposition method.

In the cathodic vacuum arc discharge deposition method, generated carbon ions in the plasma have an energy of about 20 to 100 eV. The carbon ions having the energy of this level impinge on the lowermost air bearing surface protection film 17 formed in the previous step and then penetrate into the film by several atomic layers while repeating non-elastic collision with atoms in the lowermost protection film layer for air bearing surface. By the process of non-elastic collision, nitrogen and silicon in the film obtain energy and thermal diffusion motion takes place. In this process, since nitrogen atoms form stable bonding with carbon rather than with silicon, a film having a structure in which nitrogen atoms are diffused partially to the carbon film is formed as a result. The bonding energy between nitrogen and carbon and the bonding energy between nitrogen and silicon are 754 kJ/mol and 470 kJ/mol, respectively. However, the diffusion motion is accelerated excessively or insufficient diffusion motion is caused depending on the substrate temperature, carbon ion energy, a flow-in amount of carbon ion and a deposition angle. In the deposition apparatus used in Example 1, a film is formed by the incidence of ions vertically to the substrate at room temperature by using a carbon ion energy of about 60 eV in average thereby forming a nitrogen-containing tetrahedral amorphous layer.

In addition to the method described above, nitrogen in the atmosphere can be incorporated into the film also by a cathodic vacuum arc discharge deposition method in the nitrogen atmosphere. In addition to the cathodic vacuum arc discharge deposition method, a tetrahedral amorphous carbon film of comparable property can also be formed by using a laser abrasion deposition method, a mass selective ion beam deposition method and an ion beam deposition method. The characteristics of the magnetic head having the air bearing surface protection film of the present embodiment are to be described. Experimental Examples 1 to 3 in Table 1 show magnetic heads having the air bearing surface protection film 16 prepared in this example by changing the total film thickness from 3.0 nm to 2.1 nm. As a result of a corrosion test, in a case of using a film comprising tetrahedral amorphous carbon and nitrogen as the uppermost air bearing surface protection film 18 and using the thin silicon nitride film as the lowermost air bearing surface protection film 17, sufficient corrosive resistance was observed for down to the total film thickness of 2.6 nm.

The result of the micro-scratch test of the air bearing surface protection film 16 of Example 1 on the magnetic head air bearing surface 13 is shown as Experimental Example 32 in FIG. 3. According to FIG. 3, no distinct flaking point was observed in Experimental Example 32.

The following conclusion is obtained through comparison between Example 1 and Comparative Examples 1 to 4.

At first, the corrosive resistance is to be described. In a case of an air bearing surface protection film 16 using a film comprising tetrahedral amorphous carbon and nitrogen as the uppermost air bearing surface protection film 18 and a thin silicon nitride film as the lowermost air bearing surface protection film 17, sufficient corrosive resistance was observed for down to the total thickness of 2.6 nm.

On the contrary, in a case of using an air bearing surface protection film 16 consisting of an uppermost air bearing surface protection film 18 comprising a tetrahedral amorphous carbon film and a lowermost air bearing surface protection film 17 comprising a silicon film shown in Comparative Example 1, the air bearing surface protection film did not pass the corrosion test at the total thickness of the 3 nm as shown at Comparative Example 1 in Table 1. Further, in a case of using an air bearing surface protection film 16 consisting of an uppermost air bearing surface protection film 18 comprising an amorphous carbon and a lowermost air bearing surface protection film 17 comprising silicon nitride film formed by a sputtering deposition method shown in Comparative Example 2, the air bearing surface protection film did not pass the corrosion test at the total thickness of 4.0 nm as shown by Comparative Example 2 in Table 2. As described above, the air bearing surface protection film 16 formed in Comparative Example 1 and Comparative Example 2 were inferior in denseness compared with the air bearing surface protection film 16 formed in Example 1. It is, accordingly, considered that this caused air bearing surface protection film 16 of poor corrosive resistance.

In a case of using an air bearing surface protection film 16 consisting of an uppermost air bearing surface protection film 18 comprising a hydrogen-containing amorphous carbon film and a lowermost air bearing surface protection film 17 comprising a silicon film deposited by a CVD method shown in Comparative Example 3, the air bearing surface protection film did not pass the corrosion test at the total thickness of 3 nm as shown at Comparative Example 3. Similarly, in a case of using an air bearing surface protection film 16 consisting of an uppermost air bearing surface protection film 18 comprising a hydrogen-containing amorphous carbon film and a lowermost air bearing surface protection film 17 comprising a silicon nitride film shown in Comparative Example 4, the air bearing surface protection film did not pass the corrosion test at the total thickness of the 3 nm as shown at Comparative Examples 4 in Table 1. Although, Comparative Example 4 has more dense silicon nitride film as the lowermost air bearing surface protection film 17 when compared with Comparative Example 3, it shows no significant difference in terms of the corrosive resistance. It is possible that hydrogen ions or hydrogen radicals generated in the course of film deposition by CVD may be concerned. Since bonding energy between hydrogen and nitrogen and bonding energy between hydrogen and silicon are 339 kJ/mol and 299 kJ/mol, respectively, active hydrogen is preferentially bonded with nitrogen. It is possible that nitrogen in the silicon nitride film as the lowermost air bearing surface protection film 17 shows flaking phenomenon by the reaction. In view of the above, in a case of using the silicon nitride film as the lowermost air bearing surface protection film 17 described above, hydrogen-containing amorphous carbon by the CVD method of using hydrogen in the process adopted in Comparative Example 4 is not preferred.

In view of the results described above, to attain the air bearing surface protection film 16 having sufficient corrosive resistance at a film thickness of 3.0 nm or less, it is preferred to use a silicon nitride film as the lowermost air bearing surface protection film 17 and a film comprising tetrahedral amorphous carbon and nitrogen as the uppermost air bearing surface protection film 18.

Then, mechanical wear resistance is to be described. FIG. 3 shows that the air bearing surface protection film 16 comprising a thin silicon film as the lowermost air bearing surface protection film 17 is flaked or damaged at a load shown at the flaking point 33.

On the contrary, in the experimental example in which the thin silicon nitride film is used for the lowermost air bearing surface protection film 17, such an abrupt increase in the frictional force is not observed. This may be due to the fact that nitrogen atoms present at the boundary between the lowermost air bearing surface protection film 17 and the uppermost air bearing surface protection film 18 and in the inside of each of the layers form stable bonding with carbon and silicon. In addition, it is also possible that nitrogen present near the surface of the uppermost air bearing surface protection film 18 has a function of reducing the friction coefficient in atmospheric air, and this may be attributable to high mechanical wear resistance. In view of the above, it can be said that the air bearing surface protection film 16 using a film comprising tetrahedral amorphous carbon and nitrogen as the uppermost air bearing surface protection film 18 and the silicon nitride film as the lowermost air bearing surface protection film 17 has excellent mechanical wear resistance.

EXAMPLE 2

The uppermost air bearing surface protection film 18 according to the present embodiment is a film comprising tetrahedral amorphous carbon and nitrogen. As has been described above, the corrosive resistance is not excellent in a case where the uppermost air bearing surface protection film 18 comprises amorphous carbon formed by the sputtering deposition method or hydrogen-containing amorphous carbon formed by the CVD method. No sufficient reliability can therefore be attained on the magnetic head when the extremely thin air bearing surface protection film is formed at a total film thickness of 3.0 nm or less. Since the film quality of the tetrahedral amorphous carbon film shows a characteristic result when a quantitative element analysis method such as Raman spectrometry and TOF-SIMS or RBS (Rutherford Backscattering Spectrometry) is used, the tetrahedral amorphous carbon film can be distinguished from other amorphous carbon films. The features of the tetrahedral amorphous carbon film in the present embodiment shown by the analysis method described above are shown below.

The Raman spectroscopy is often used in a case of indirectly analyzing the sp3 content which is one of the most important properties of amorphous carbon. While most of spectra obtained from a conventional Ar light source at a wavelength of 514.5 nm are from the sp2 component, the content of sp3 at the periphery of sp2 can also be estimated indirectly. Specifically, as the intensity for peak B at about 1200 to 1450 cm$^{-1}$ relative to the intensity of peak A at about 1500 to 1600 cm$^{-1}$ is smaller, this shows that more sp3 component are present at the periphery of the sp2 bonding and it can be estimated that sp3 is a predominant component when the peak B is scarcely observed.

FIG. 4 shows a Raman spectrum 41 measured for the air bearing surface protection film containing tetrahedral amorphous carbon formed by the cathodic vacuum arc discharge deposition method at the magnetic head element 12 on the magnetic head air bearing surface 13. For peak A 42 and a peak B 43 obtained by fitting using the Gaussian function in a Raman spectrum 41, the peak intensity ratio (B/A) is 0.27.

FIG. 5 shows a Raman spectrum 51 measured for the air bearing surface protection film 16 containing tetrahedral amorphous formed by an identical cathodic vacuum arc discharge deposition method at an alumina-titanium-carbide substrate portion on the magnetic head air bearing surface 13. When compared with the Raman spectrum measured in the magnetic head element portion, while the background gradient is larger, the peak ratio can be determined by subtracting the background and applying fitting by the Gaussian function in the same manner as measured on the magnetic head element portion. The Raman spectroscopic measurement is preferably conducted on the magnetic head element portion 12; however, if it is difficult, the measurement may be performed on alumina-titanium-carbide. Referring to a peak A 52 and a peak B 53 obtained by fitting using the Gaussian function for the Raman spectrum 51, the peak intensity ratio (B/A) is 0.1.

FIG. 6 shows a Raman spectrum 61 measured for the air bearing surface protection film 16 containing amorphous carbon formed by a sputtering deposition method at the magnetic head element portion 12 on the magnetic head air bearing surface 13. For a peak A 62 and a peak B 63 obtained by fitting using the Gaussian function in the Raman spectrum 61, the peak intensity ratio (B/A) is 0.91.

FIG. 7 shows a Raman spectrum 71 measured for the air bearing surface protection film 16 containing amorphous carbon formed by a CVD method at the magnetic head element portion 12 on the magnetic head air bearing surface 13. For a peak A 72 and a peak B 73 obtained by fitting using the Gaussian function in the Raman spectrum 71, the peak intensity ratio (B/A) is 0.31.

When the Raman spectra in FIGS. 4 to 7 are observed, the Raman spectrum for the tetrahedral amorphous carbon film formed by the cathodic vacuum arc discharge deposition method is similar to that for hydrogen-containing amorphous carbon film formed by the CVD method. The peak intensity ratio (B/A) is about 0.3. This may possibly be attributable to that preferred film deposition conditions are selected upon formation of the hydrogen-containing amorphous carbon film in the CVD method and, the resulting deposited film has a number of sp3 bondings. Accordingly, it is difficult to distinguish the tetrahedral amorphous carbon film from the hydrogen-containing amorphous carbon film formed by the CVD method based on the result of the Raman spectroscopy. On the other hand, in the Raman spectrum 61 for the amorphous carbon film formed by the sputtering deposition method, the intensity ratio (B/A) between the peak A 62 and peak B 63 is 0.91.

The peak intensity ratio (B/A) derived from fitting by the Gaussian function varies depending on the method of fitting. However, for the Raman spectrum of the amorphous carbon film formed by the sputtering deposition method, the peak intensity ratio (B/A) of 0.4 or less is not observed. Then, in a case when the peak intensity ratio (B/A) of the Raman spectrum is 0.4 or less, it can be said that the amorphous carbon film is tetrahedral amorphous carbon formed by the cathodic vacuum arc discharge deposition method or hydrogen-containing amorphous carbon formed by the CVD method.

On the other hand, tetrahedral amorphous carbon as the uppermost air bearing surface protection film of the present embodiment is characterized in that the deposited film scarcely contains hydrogen therein. The amorphous carbon prepared by the CVD method contains several tens atomic % in the film since hydrogen is used in the process.

Hydrogen element can be analyzed by using TOF-SIMS in a minute portion on the magnetic head air bearing surface where the air bearing surface protection film is formed. In this example, measurement was conducted in a 100 μm×100 μm region. TOF-SIMS is a method of applying ion beams to a specimen and measuring the kind and the amount of existent elements based on the intensity of sputtered secondary ions.

FIG. 8 shows the experimental result for TOF-SIMS on the air bearing surface 13 of the magnetic head having the air bearing surface protection film 16 comprising a hydrogen-containing amorphous carbon film and a silicon film formed by a CVD method. The ordinate expresses the secondary ion intensity, and the abscissa expresses the depth from the surface. The magnetic head used for measurement is provided with an uppermost air bearing surface protection film 18 of 4 nm thick and a lowermost air bearing surface protection film of 2 nm thick. Relative values of the secondary hydrogen ion intensity and the secondary carbon ion intensity are characterized in that the value of the secondary hydrogen ion intensity is higher. As a result of comparison with a standard specimen, it was observed that the hydrogen-containing amorphous carbon constituting the uppermost air bearing surface protection film 18 contained about 50 atomic % of hydrogen.

FIG. 9 shows the experimental result for TOF-SIMS on the air bearing surface 13 of the magnetic head having the air bearing surface protection film 16 comprising a tetrahedral amorphous carbon film and a silicon film formed by a cathodic vacuum arc discharging. The ordinate expresses the secondary ion intensity, and the abscissa expresses the depth from the surface. The magnetic head used for measurement is provided with an uppermost air bearing surface protection film 18 of 3 nm thick and a lowermost air bearing surface protection film of 2 nm thick. The hydrogen secondary ion intensity and the carbon secondary intensity are substantially equal to each other. As a result of comparison with a standard specimen, it was observed that the tetrahedral amorphous carbon constituting the uppermost air bearing surface protection film 18 contained about 18 atomic % of hydrogen.

FIG. 10 shows the experimental result for TOF-SIMS on the air bearing surface 13 of the magnetic head having the air bearing surface protection film 16 comprising a tetrahedral amorphous carbon and silicon. The ordinate expresses the secondary ion intensity, and the abscissa expresses the depth from the surface. The magnetic head used for measurement is provided with an uppermost air bearing surface protection film 18 of 2 nm thick and a lowermost air bearing surface protection film of 1 nm thick. It was observed that the film comprising tetrahedral amorphous carbon and nitrogen constituting the uppermost air bearing surface protection film 18 contained about 18 atomic % of hydrogen.

When TOF-SIMS measurement is conducted, it has to be noted that adsorbate of hydrocarbon compounds are present on the surface. To avoid measurement of the surface adsorbate, it is necessary either to remove the adsorbate by sputtering or ion beam irradiation before start of measurement for TOF-SIMS, or to neglect data obtained within a constant period of time from the start of the measurement.

Further, even for a tetrahedral amorphous carbon film with the hydrogen content of about several atomic % or less, as a bulk material, when measurement is conducted by TOF-SIMS at a film thickness of 5 nm or less as used for the air bearing surface protection film, hydrogen of as much as about 20 atomic % which was not detected in the bulk is detected due to the effect of adsorption and diffusion into the film of hydrogen atoms from hydrocarbon compounds or molecules of water in atmospheric air. However, since the quantitative analysis by TOF-SIMS changes somewhat depending on the type and the number of standard specimens referred to, the value for the hydrogen content of 18 atomic % in tetrahedral amorphous carbon as a result of analysis in this example can also take different values depending on the standard specimen to be used. In this example, after preparation of several amorphous carbon films of different hydrogen contents at a film thickness of about 50 nm, they were measured by the same TOF-SIMS, and the hydrogen content in the air bearing surface protection film 16 on the magnetic head air bearing surface was quantified based on the calibration curve prepared from the ratio between the secondary ion intensity of hydrogen and the secondary intensity of carbon obtained. The quantified hydrogen content varied even in one and the same specimen depending on the kind of the standard specimen and the way of drawing the calibration curve used in the process. Amorphous carbon with the hydrogen content of 1.6 atomic % as a thick film was analyzed to have the hydrogen content of 5% or more and 25% or less as a result of TOF-SIMS measurement in the air bearing surface protection film at 3 nm thick on the magnetic head. On the other hand, a hydrogen-containing amorphous carbon with the hydrogen-content of 35% in a thick film was analyzed to have the hydrogen content of 40 atomic % or more and 80 atomic % or less as a result of TOF-SIMS measurement in the air bearing surface protection film at a thickness of 3 nm on the magnetic head. In view of the above, in a case of conducting TOF-SIMS for the magnetic head air bearing surface protection film, when the hydrogen content is about 25 atomic % or less, it can be recognized that the carbon film comprises tetrahedral amorphous carbon.

On the other hand, as apparent from comparison among FIGS. 8, 9 and 10, a distinct meaningful difference has been detected between hydrogen-containing amorphous carbon and tetrahedral amorphous carbon in view of the secondary ion intensity ratio between hydrogen and carbon; therefore, it can be determined whether the film is a hydrogen-containing amorphous carbon film by the CVD method or a tetrahedral amorphous carbon by observing the trend.

As described above, the tetrahedral amorphous carbon film is characterized in that the peak intensity ratio (B/A) of the Raman spectra is 0.4 or less and hydrogen is about 25 atomic % or less in a case of Raman spectroscopy and TOF-SIMS analysis.

According to the present embodiment, the lowermost air bearing surface protection film 17 comprises nitrogen and silicon and the uppermost air bearing surface protection film 18 comprises tetrahedral amorphous carbon, and each of elements can be analyzed by using TOF-SIMS as shown in FIGS. 8 to 10. From FIG. 10, it can be confirmed that the air bearing surface protection film 16 of the magnetic head prepared by Example 1 contains nitrogen in the uppermost layer and the lowermost layer. As described above, quantitative analysis is also possible by using a thick standard specimen. Elemental analysis on the magnetic head can be observed easily also by using XPS (X-ray Photoelectron Spectroscopy).

EXAMPLE 3

In FIG. 11, abscissa expresses the film thickness and the ordinate expresses the number of pinholes for a silicon film and a silicon nitride film. The silicon film and the silicon nitride film were prepared by using the sputtering deposition method and the reactive sputtering deposition method, respectively. According to FIG. 11, the thin silicon nitride film exhibits smaller number of pinholes than that of the thin silicon film at an identical film thickness. That is, the thin silicon nitride film is excellent in the corrosive resistance and the electrical insulative property and has greater number of bondings attributable to adhesion with the uppermost air bearing surface protection film 18. In the reactive sputtering, a film was formed while the nitrogen flow ratio in the sputtering gas is changed from 10% to 50% as shown in FIG. 11.

In view of FIG. 11, when a thin silicon nitride film is prepared under certain conditions, the number of pinholes in the film with a thickness of 1 nm is equal to that of the existent thin silicon film of 2 nm thick. The thin silicon nitride film having a film thickness of about 0.5 nm is comparable with a thin silicon film with a thickness of 1.5 nm with respect to the number of pinholes. Since thin silicon films of 1.5 nm to 2.0 nm thickness have been employed at present for the lowermost air bearing surface protection film 17, the magnetic spacing can be reduced while satisfactory corrosive resistance and electrical insulative property are maintained by using a thin silicon nitride film of about 0.5 nm or more.

Since an increase in the thickness of the lowermost air bearing surface protection film 17 results in a drawback of increasing the magnetic spacing. On the other hand, a reduction in the thickness of the uppermost layer for the air bearing surface protection film deteriorates the durability of the magnetic head. It is desirable that the thickness of the lowermost layer excluding the uppermost layer be less than a predetermined level. Since the film thickness of the lowermost air bearing surface protection film 17 using the thin silicon film in the prior art is 2 nm or less, an equivalent upper limit value is required also for the silicon nitride film. In view of the above, in a case of using the silicon nitride film for the lowermost air bearing surface protection film 17, it is desirable that the thickness be about 2 nm or less and about 0.5 nm or more.

EXAMPLE 4

Figure 12:
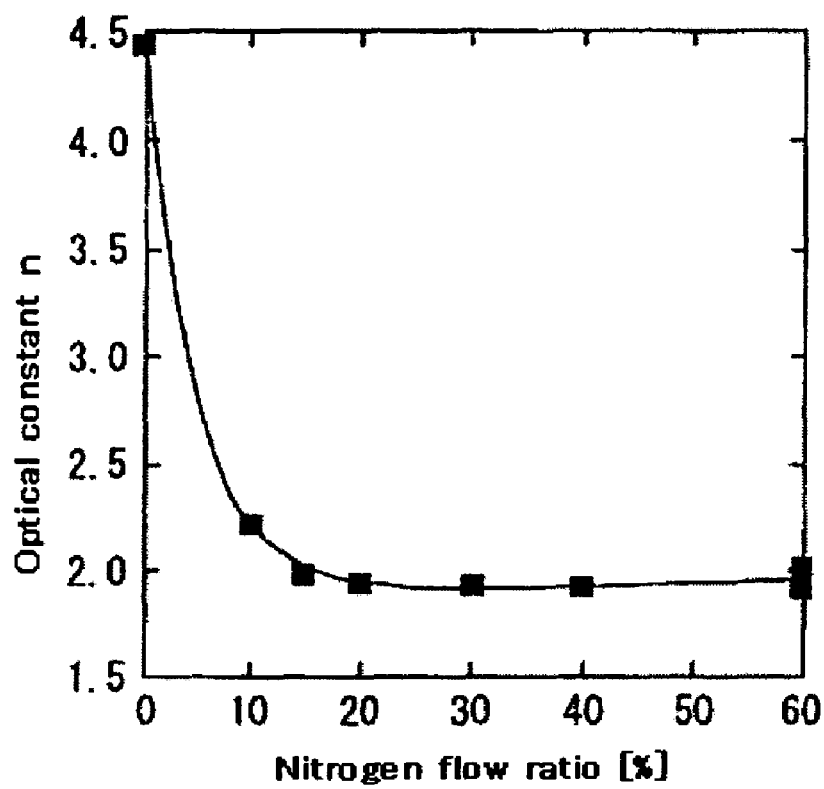
FIG. 12 is a graph showing the dependence of an optical constant n on a nitrogen flow ratio according to an embodiment of the invention.
Figure 12:
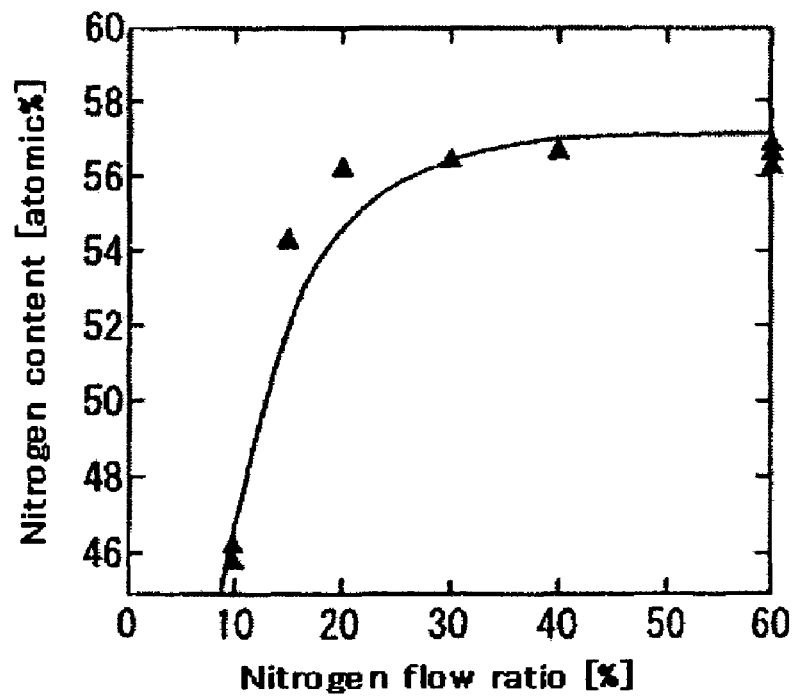

In Example 1, the silicon nitride film as the lowermost air bearing surface protection film 17 is prepared by reactive sputtering. FIG. 12 shows the dependence of the optical constant n of a silicon nitride film formed by reactive sputtering on the nitrogen flow ratio. At the nitrogen flow ratio of 0%, only argon is introduced into the film deposition chamber and, as a result, a lowermost air bearing surface protection layer 17 of the prior art containing silicon and not-containing nitrogen is formed. In the silicon nitride film, the composition ratio of nitrogen to silicon can be determined in accordance with the optical constant n. The relation between the compositional ratio and the optical constant of the silicon nitride film is expressed by the following formula, by S. K. Ray in "Effect of reactive-ion bombardment on the properties of silicon nitride and oxynitride films deposited by ion-beam sputtering" (Journal of Applied Physics, 75 (12), 15 Jun. 1994, pp 8145-8152).

$$\text{Optical constant } n=0.7\times(\text{compositional ratio Si/N})+1.4 \tag{1}$$

The formula (1) is effective when the N content is 20 atomic % or more. Based on the formula (1), it can be seen that since a dense silicon nitride film shown in Example 3 has been deposited by using a sputtering gas with a nitrogen flow ratio of 10% or more and 50% or less, the nitrogen content in the film is about 45 atomic % or more and about 57 atomic % or less in view of FIG. 12(*b*). The compositional ratio is demonstrated, for example, also by XPS analysis for the silicon nitride film. The nitrogen content in the silicon nitride film is 57 atomic % in view of the stochiometrical composition. In a case where the nitrogen is contained by more than 57 atomic %, since silicon nitride is embrittled, it is not suitable to the invention.

In view of FIG. 13, since the silicon nitride film formed by reactive sputtering at a nitrogen flow ratio of 10% or more and 50% or less is dense, the silicon nitride film is excellent in density when the nitrogen content is about 45 atomic % or more and about 57 atomic % or less. Consequently, the use of the silicon nitride film provides an air bearing surface protection film 16 of excellent corrosive resistance, electrical insulative property and mechanical wear resistance.

EXAMPLE 5

FIG. 13 shows that the density of the silicon nitride film shown in FIG. 11 is 2.6 g/cc in any case. While a tendency is observed in which the probability for the occurrence of pinholes is smaller as the density is higher and they show excellent coverage compared with the silicon film. In view of the above, the mass density is preferably 2.6 g/cc or more for preparing an air bearing surface protection film 16 having good corrosive resistance and electrical insulative property. The silicon nitride film has a density of 3.2 g/cc in a crystalline state having a stoichiometrical composition and this value is an upper limit value for the density of the silicon nitride film.

EXAMPLE 6

FIG. 14 is a cross-sectional constitutional view of a magnetic disk 14 having a protection film prepared by the same preparing method as that for the magnetic head air bearing surface protection film 16 shown in Examples 1 to 5. A protection film having the function comparable with that of the magnetic head air bearing surface protection film 16 is also required for the magnetic disk 14 as a magnetic recording medium in specific embodiments. That is, a hard, dense, chemically stable film is necessary. While the existent air bearing surface protection films of the magnetic disks are formed of nitrogen and amorphous carbon, they involve various problems in view of density and hardness.

Then, it has been found that the formation of a protection film for the magnetic disk 10 with an upper protection film layer 141 comprising tetrahedral amorphous carbon and nitrogen and a lower protection film 142 comprising nitrogen and silicon can provide favorable mechanical wear resistance and corrosive resistance as compared with an existent protection film comprising amorphous carbon and nitrogen. Numeral 143 represents a Co—Cr based alloy recording magnetic film. Numeral 144 represents a Cr alloy underfilm. Numeral 145 represents a Ni—Cr based precoat film. Numeral 146 represents an upper disk substrate made of glass.

In accordance with the magnetic head of the present embodiment of the present invention, an air bearing surface protection film having good adhesion at the boundary of slider materials, excellent durability and high corrosive resistance can be provided by using a film containing silicon nitride as the lowermost air bearing surface protection film and using tetrahedral amorphous carbon as the uppermost air bearing surface protection film. In addition, it is possible to attain an increase in higher recording density and improvement of the reliability due to reduction in spacing loss for the magnetic recording apparatus.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic head in which a surface of a magnetic read/write device facing a magnetic recording medium is covered with a protection film,
   wherein the protection film comprises a stack of a plurality of films including:
   a lowermost layer for an air bearing surface protection film as a layer in contact with the magnetic read/write device comprises a layer containing nitrogen and silicon; and
   an uppermost layer for an air bearing surface protection film as a layer positioned at the uppermost surface of the air bearing surface protection film comprises a layer containing tetrahedral amorphous carbon and nitrogen.

2. A magnetic head according to claim 1, wherein the film comprising tetrahedral amorphous carbon and nitrogen constituting the uppermost layer for the air bearing surface protection film has a hydrogen content of about 25 atomic % or less, when measured on a magnetic head, and the Raman intensity ratio (B/A) between one peak (A) present at about 1500 to 1600 cm$^{-1}$ and the other peak (B) present at about 1200 to 1450 cm$^{-1}$ is about 0.0 or more and about 0.4 or less.

3. A magnetic head according to claim 2, wherein the silicon nitride film constituting the lowermost layer for the air bearing surface protection film has a thickness of about 0.5 nm or more.

4. A magnetic head according to claim 3, wherein the silicon nitride film constituting the lowermost layer for the air bearing surface protection film has a thickness of about 2 nm or less.

5. A magnetic head according to claim 4, wherein the silicon nitride film constituting the lowermost layer for the air bearing surface protection film has a nitrogen content of about 45 atomic % or more and about 57 atomic % or less.

6. A magnetic head according to claim 2, wherein the silicon nitride film constituting the lowermost layer for the air bearing surface protection film has a nitrogen content of about 45 atomic % or more and about 57 atomic % or less.

7. A magnetic head according to claim 1, wherein the silicon nitride film constituting the lowermost layer for the air bearing surface protection film has a thickness of about 0.5 nm or more.

8. A magnetic head according to claim 7, wherein the silicon nitride film constituting the lowermost layer for the air bearing surface protection film has a thickness of about 2 nm or less.

9. A magnetic head according to claim 8, wherein the silicon nitride film constituting the lowermost layer for the air bearing surface protection film has a nitrogen content of about 45 atomic % or more and about 57 atomic % or less.

10. A magnetic head according to claim 1, wherein the silicon nitride film constituting the lowermost layer for the air bearing surface protection film has a nitrogen content of about 45 atomic % or more and about 57 atomic % or less.

* * * * *